United States Patent
Yamaguchi et al.

[11] Patent Number: 5,198,984
[45] Date of Patent: Mar. 30, 1993

[54] NUMERICAL CONTROL METHOD FOR CORRECTING MACHINE TOOL PATH ERRORS

[75] Inventors: Takahiro Yamaguchi; Kenji Ito, both of Niwa, Japan

[73] Assignee: Okuma Corporation, Aichi, Japan

[21] Appl. No.: 770,404

[22] Filed: Oct. 3, 1991

Related U.S. Application Data

[63] Continuation-in-part of Ser. No. 401,055, Aug. 31, 1989, abandoned.

[30] Foreign Application Priority Data

Aug. 31, 1988 [JP] Japan .................. 63-217239

[51] Int. Cl.$^5$ .................................. G06F 15/00
[52] U.S. Cl. .................. 364/474.30; 318/571
[58] Field of Search ........... 364/176, 177, 183, 474.28, 364/474.29, 474.30; 318/567, 569, 570, 571, 572

[56] References Cited

U.S. PATENT DOCUMENTS 3,767,900 10/1973 Chao et al. .
4,663,703 5/1987 Axelby et al. .
4,682,089 7/1987 Tamari .
4,947,336 8/1990 Froyd .................. 364/474.30
4,953,076 8/1990 Yamamoto .

Primary Examiner—Jerry Smith
Assistant Examiner—Patrick D. Muir
Attorney, Agent, or Firm—Wenderoth, Lind & Ponack

[57] ABSTRACT

A numerical control method controls a machining path of a tool. A second feed speed data is determined which causes a machining path error that is N times as large as a prescribed first path error when the machining path of the tool is driven according to an instructed first machining path data. An actual machining path of the tool is predicted according to the first machining path data and the second feed speed data. A second path error data is determined according to a difference between the predicted machining path and the first machining path data. A positional correction data is obtained by subtracting the first path error data from the second path error data. Then, second machining path data is calculated by adjusting the first machining path data by an amount corresponding to the positional correction data. A machine tool is driven according to the second machining path data and the second feed speed data. During driving of the machining tool, an actual machining path of the machine tool is detected to correct the second feed speed data.

4 Claims, 12 Drawing Sheets

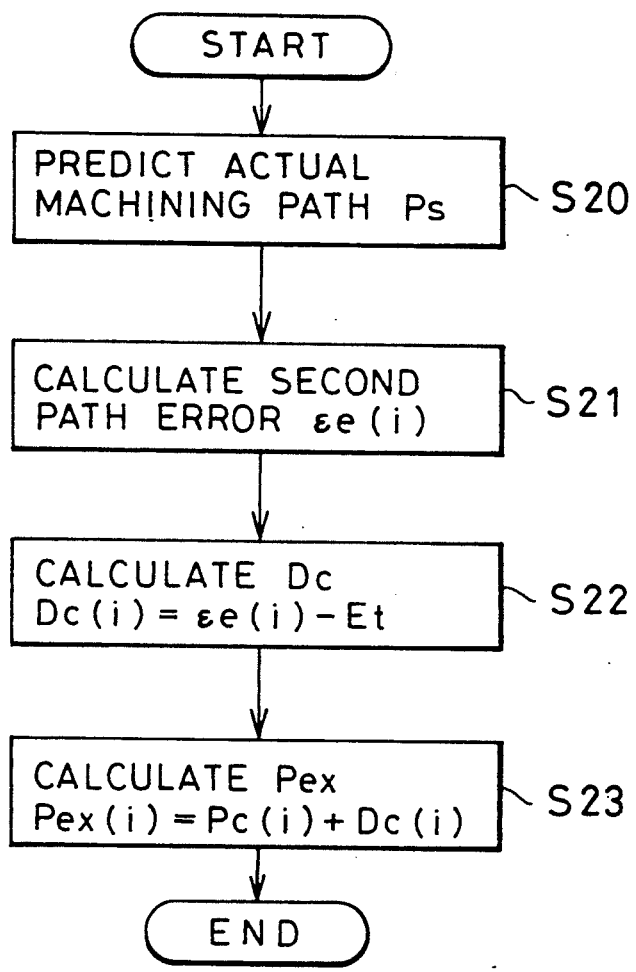
F I G. 6

NUMERICAL CONTROL METHOD FOR CORRECTING MACHINE TOOL PATH ERRORS

CROSS-REFERENCE TO RELATED APPLICATION

This application is a continuation-in-part of our prior application Ser. No. 401,055, filed on Aug. 31, 1989, entitled "NUMERICAL CONTROL METHOD" and now abandoned.

BACKGROUND OF THE INVENTION

This invention relates to a numerical control method which controls a driving section of a numerical control machine tool to limit path errors caused by the discrepancy between a target tool path of machining program instructions and an actual tool path of the machine tool within tolerable path errors entered previously.

In prior art numerical control (NC) machine tools, an input machining program instructs the machining shape, feed speed, tools to be used, etc. for a machining process. However, in actual practice, deviations (or path errors) are often caused between the target tool path as instructed by the machining program and the actual path taken by the tool as a result of time lags and so on in the machine servo system. The path errors are particularly conspicuous in curved shapes which fluctuate when the cutting speed is high and especially in corners where the change rate for the curves is drastic.

In order to overcome such problems, there has recently been proposed a numerical control method which calculates the feed speed based on an instructed target path so as to limit path errors within a tolerable range, and controls the driving section of the NC machine tool based on the calculated feeding speed.

FIG. 1 is a block diagram showing an embodiment of the NC system which realizes a prior art numerical control method.

In FIG. 1, the NC system which realizes the conventional numerical control method comprises a machining program 1 stored on a sheet of paper tape, an outside input device 2 which is inputted with a tolerable path error (hereinafter refer to a first path error) $E_t$, a machining program interpreting section 3 which interprets the content of the machining program 1 and which calculates a first machining path $P_c$ and a first feed speed $F_c$, an instructed shape evaluating section 4 which calculates the machining shape data (hereinafter refer to a first shape evaluated data) SD, a function generating section 5 which calculates an amount of movement $\Delta f$ per unit time, a feed speed correcting section 9 which corrects the first feed speed $F_c$, a feed shaft motor (M)7 which drives a machine tool, a servo controlling section 6 which controls the feed shaft motor 7, and a position detector (D) 8 which detects the actual position of the tool and so on.

In the machining program 1, machining paths (relative moving paths of a tool to a work) and feed speed (relative speed of a tool to a work) which are designed by an operator are described. The machining program interpreting section 3 inputs the machining program 1 and outputs the first machining path $P_c$ and the first feed speed $F_c$.

The machining program 1 is read by a block and the first machining path $P_c$ and the first feed speed $F_c$ are calculated. As machining paths described in the machining program 1 include amounts of an origin offset, a tool offset e.g., the first machining path $P_c$ is calculated by adding amounts of the origin offset, the tool offset e.g. to the machining paths described in the machining program 1. As to the first feed speed $F_c$, it is the same as a feed speed described in the machining program 1, in the concrete, if a feed speed instruction is included in a block, this section renews the first feed speed $F_c$. The instructed shape evaluating section 4 inputs the first machining path $P_c$ and outputs the first shape evaluated data SD.

Coordinates data which make the first machining path $P_c$ are represented $P_c(i)$.

$$\begin{aligned} P_c(i) &= (Xi, Yi, Zi) \\ P_c(i+1) &= (Xi+1, Yi+1, Zi+1) \\ P_c(i-1) &= (Xi-1, Yi-1, Zi-1) \end{aligned} \quad (1)$$

Radius of a circle on which $P_c(i)$, $P_c(i+1)$, $P_c(i-1)$ lie is represented $R_c(i)$. Angle at which line segment $\overline{P_c(i-1)P_c(i)}$ and line segment $P_c(i)P_c(i+1)$ meet is represented as $Ag(i)$.

Example of calculating the first shape evaluated data SD is as follows:

The first shape evaluated data SD which are calculated with the coordinates data $P_c(i)$ which make the first machining path $P_c$ are represented SD(i).

$$\begin{aligned} SD(i) &= \text{radius } R_c(i) \\ SD(i) &= \text{angle } Ag(i) \\ SD(i) &= (R_c(i-1) + K * R_c(i) + R_c(i+1))/(2 + K) \\ &\quad (K \text{ is a weight coefficient: } K \geq 1) \end{aligned} \quad (2)$$

The above prior art NC system effects numerical controlled machining in the following manner.

The machining program 1 is inputted to the NC system via a tape reader or the like, and the data of each block of the machining program 1 is read out in the machining program interpreting section 3. The machining program interpreting section 3 analyses each block of data to calculate the first machining path $P_c$ and the first feed speed $F_c$. The first machining path $P_c$ is inputted to the function generating section 5 as well as in the instructed shape evaluating section 4, which subsequently calculates the first shape evaluated data SD based on the inputted first machining $P_c$.

The first shape evaluated data SD is fed to a feed speed correcting section 9, which inputs the first feed speed $F_c$, the first path error $E_t$, the first evaluated data SD, the amount of movement $\Delta f$ per unit of time (data outputted from the function generating section 5) and the detected value $P_a$ (the actual machining path which is outputted from the position detector 8 attached to a feed shaft motor 7), and outputs the third feed speed $F_{ex}$.

The operation will be described with reference to FIG. 2.

Radius of curvature $R_c(i)$ on the point specified by the coordinates data $P_c(i)$ which make the first machining path $P_c$ is adopted as the first shape evaluated data SD. A $d_t(t)$ which is a follow-up lag at a time "t" is related to coordinates data at a time "t" of the first machining path, denoted $P_c(t)$, and coordinates data at a time "t" of the actual machining path, denoted $P_a(t)$, as following formula.

$$d(t) = P_c(t) - P_a(t) \quad (3)$$

FIG. 3 is a flow chart showing the operation of the feed speed correcting section 9 described below.

A tolerable follow-up lag "$d_r$" is calculated which causes a path error which is equal to the first path error $E_t$ in case driving feed shaft motor 7 under the condition that; machining path=the first machining path $P_c$ (Step S10). The detail content of predicting the tolerable follow-up lag "$d_r$" is distinct because the first machining path $P_c$ is approximated to the curved line of which curvature radius is $R_c(i)$ using the first shape evaluated data SD, therefore its description will be omitted here. The coordinates data of an instructed machining path (which is virtually the same as the first machining path $P_c$) are calculated by accumulating the amount of movement $\Delta f$ per unit of time, and an actual follow-up lag calculated by subtracting the detected actual machining path $P_a$ from the calculated coordinates data (Step S11). If the actual follow-up lag > the tolerable follow-up lag "$d_r$"; the third feed speed $F_{ex}$ decreasing the first feed speed $F_c$ (Steps S12 and S13). If the actual follow-up lag = the tolerable follow-up lag "dr"; the third feed speed $F_{ex}$ is set up equal to the first feed speed $F_c$ (Steps S14 and S15). If the actual follow-up lag < the tolerable follow-up lag "$d_r$"; the third feed speed $F_{ex}$ is calculated by increasing the first feed speed $F_c$, or the third feed speed $F_{ex}$ is set up equal to the first feed speed $F_c$ (Step S16).

Lastly, the function generating section 5 calculates the amount of movement $\Delta f$ per unit time based on the first machining path $P_c$ and the third feed speed $F_{ex}$, and the servo controlling section 6 drives the feed shaft moter 7 based on the amount of movement $\Delta f$ per unit of time.

As mentioned above, the prior art system limits the path errors to within the first path error $E_t$ range by comparing the tolerable follow-up lag calculated from the machining program target path and the first path error $E_t$ inputted in advance with the actual follow-up lag, and correcting the first feed speed $F_c$ to remain within the tolerable follow-up lag.

However, the prior art numerical control method mentioned above is inconvenient in that even if the machining program instructs a high cutting speed to finish the machining in a short period of time, cutting cannot be performed at a high speed at locations where the machining shape rapidly changes, such as a curved portion or at corners where the rate of change is high. Therefore, the total machining time is inevitably increased. The increase in machining time poses a particularly serious problem in metal die machining which often takes a long time.

SUMMARY OF THE INVENTION

This invention was conceived to eliminate such inconveniences encountered in the prior art and aims at providing a numerical control method which can obtain a path error within a torerable path error, and further which can prevent an increases in the machining time due to the reduction in feed speed and which can achieve stable machining precision allowing errors which are caused by unexpected factors.

According to one aspect of this invention, for achieving the obejcts described above, there is provided a numerical control method for controlling a machining path of a tool in accordance with a first machining path data denoting an instructed machining path from a machine program, a first feed speed data denoting an instructed feed speed from the machine program, and a first path error data denoting a prespecified tolerable path errror, said method comprising the steps of: determining a second feed speed data which causes a machining path error that is N times as large as that of the first path error data when the machining path of the tool is driven according to the first machining path data, N being determined in advance; predicting an actual machining path of the tool according to the first machining path data and the second feed speed data; determining a second path error data according to a difference between the predicted actual machining path and the first machining path data; obtaining a first positional correction data by subtracting the first path error data from the second path error data; calculating a second machining path data by adjusting the first machining path data by an amount corresponding to the first positional correction data in a direction opposing a direction in which a path error occurs; calculating an amount of movement per unit of time in accordance with the second machining path data and the second feed speed data; driving the machine tool according to the calculated amount of movement per unit of time; and, detecting an actual machining path of the driven machine tool, calculating an actual follow-up lag data between the detected actual machining path and the second machining path data, and correcting the second feed speed data according to the actual follow-up lag data and the first path error data.

According to another aspect of this invention, there is provided a numerical control method for controlling a machining path of a tool in accordance with a first machining path data denoting an instructed machining path from a machine program, a first feed speed data denoting an instructed feed speed from the machine program, and a first path error data denoting a prespecified tolerable path error, said method comprising the steps of: determining a path error prediction coefficient according to a directional rate of change of the first machining path data; predicting an actual machining path of the tool according to the first machining path data and the first feed speed data; determining a second path error data according to a difference between the predicted actual machining path and the first machining path data; obtaining a first positional correction data by subtracting the first path error data from the second path error data; obtaining a second positional correction data by multiplying the first positional correction data by the path error correction coefficient; calculating a second machining path data by adjusting the first machining path data by an amount corresponding to the second positional correction data in a direction opposing a direction in which a path error occurs; calculating an amount of movement per unit of time in accordance with the second machining path data and the first feed speed data; driving the machine tool according to the calculated amount of movement per unit of time; and, detecting an actual machining path of the driven machine tool, calculating an actual follow-up lag data between the detected actual machining path and the second machining path data, and correcting the first feed speed data according to the actual follow-up lag data and the first path error data.

Further, according to still another aspect of this invention, there is provided a numerical control method for controlling a machining path of a tool in accordance with a first machining path data denoting an instructed machining path from a machine program, a first feed speed data denoting an instructed feed speed from the machine program, a first path error data denoting a prespecified tolerable path error, and first tolerable positional correction data, said method comprising the steps of: determining a second feed speed data which causes a machining path error that is within a sum of the first tolerable positional correction data and the first path error data when the machining path of the tool is driven according to the first machining path data; predicting an actual machining path of the tool according to the first machining path data and the second feed speed data; determining a second path error data according to a difference between the predicted actual machining path and the first machining path data; obtaining a first positional correction data by subtracting the first path error data from the second path error data; calculating a second machining path data by adjusting the first machining path data by an amount corresponding to the first positional correction data in a direction opposing a direction in which a path error occurs; calculating an amount of movement per unit of time in accordance with the second machining path data and the second feed speed data; driving the machine tool according to the calculated amount of movement per unit of time; and, detecting an actual machining path of the driven machine tool, calculating an actual follow-up lag data between the detected actual machining path and the second machining path data, and correcting the second feed speed data according to the actual follow-up lag data and the first path error data.

Still further, according to another aspect of this invention, there is provided a numerical control method for controlling a machining path of a tool in accordance with a first machining path data denoting an instructed machining path from a machine program, a first feed speed data denoting an instructed feed speed from the machine program, a first path error data denoted a prespecified tolerable path error, and first tolerable positional correction data, said method comprising the steps of: determining a path error prediction coefficient according to a directional rate of change of the first machining path data; determining a second tolerable position data by multiplying the first tolerable positional correction data by the path error prediction coefficient; determining a second feed speed data which causes a machining path error that is within a sum of the second tolerable positional data and the first path error data when the machining path of the tool is driven according to the first machining path; determining a second path error data according to a difference between the predicted actual machining path and the first machining path data; obtaining a first positional correction data by subtracting the first path error data from the second path error data; calculating a second machining path data by adjusting the first machining path data by an amount corresponding to the first positional correction data in a direction opposing a direction in which a path error occurs; calculating an amount of movement per unit of time in accordance with the second machining path data and the second feed speed data; driving the machine tool according to the calculated amount of movement per unit of time; and, detecting an actual machining path of the driven machine tool, calculating an actual follow-up lag data between the detected actual machining path and the second machining path data, and correcting the second feed speed data according to the actual follow-up lag data and the first path error data.

The nature, principle and utility of the invention will become more apparent from the following detailed description when read in conjunction with the accompanying drawings.

BRIEF DESCRIPTION OF THE DRAWINGS

In the accompanying drawings:

FIG. 6 is a flow chart of the clculation of the second machining path $P_{ex}$;

PREFERRED EMBODIMENTS OF THE INVENTION

An numerical control method according to this invention can secure machining precision allowing errors which may generate due to unpredictable factors without the necessity of drastically lowering the feed speed by correcting an instructed machining path obtained from a machining program based on a tolerable path error which has been inputted in advance, and correcting the feed speed with information obtained by detecting the actual position of the feed shaft motor.

This invention is directed to a method for controlling tool path errors by means of static feed speed correction, positional correction, and dynamic feed speed correction.

Each of these three correction aspects are discussed briefly below.

(1) Static feed speed correction

A feed speed (hereinafter refer to a second feed speed) is calculated which causes a path error which is within n (n≧1; integer) times a tolerable path error (hereinafter refer to a first path error) inputted by an operator when a feed shaft motor is driven according to an instructed machining path of a machining program (hereinafter refer to a first machining path).

(2) Positional correction

A machining path (hereinafter refer to a second machining path) is calculated which causes a path error is within the first path error when a feed shaft motor is driven according to the second feed speed. In this case the amount of positional correction amounts to at most (n−1)×the first path error.

(3) Dynamic feed speed correction

If a feed shaft motor is driven at the second feed speed to machine along the second machining path, a path error is obtained that is theoretically within the first path error. However, dynamic factors such as unpredictable mechanical delay sometimes caused a path error which is more than the first path error. Therefore, a correction of the second feed speed is carried out by detecting an actual machining path in order to maintain a path error within the first path error even upon occurrences of dynamic factors such as an unpredictable mechanical delay. Moreover, a tolerable follow-up lag is calculated which causes a path error (which is the same as the first path error + the amount of positional correction) when a feed shaft motor is driven according to the second machining path, and an actual follow-up lag is calculated by detecting a real position of a feed shaft motor. Lastly, the second feed speed is corrected by comparing the actual follow-up lag with the tolerable follow-up lag.

Figure 1:
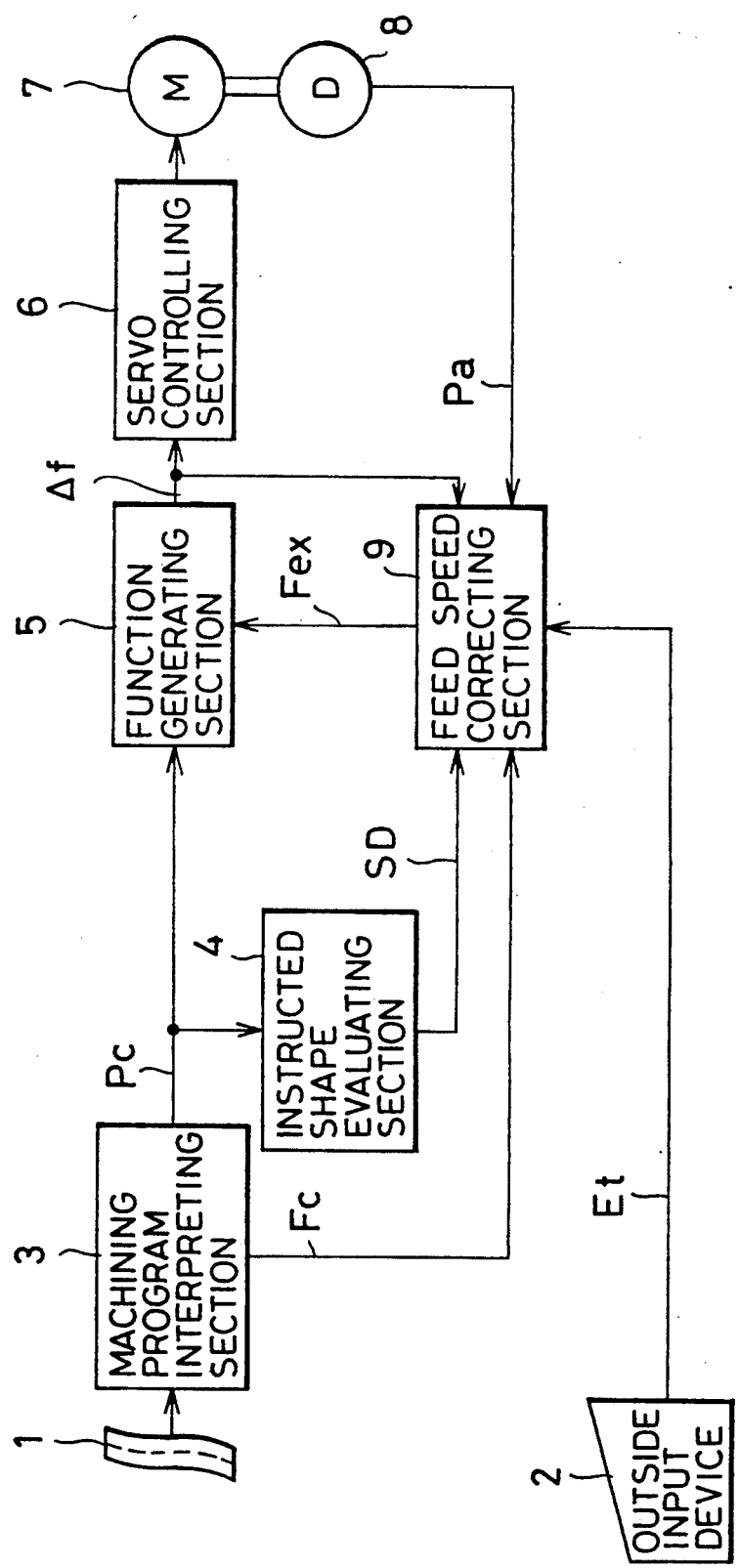
FIG. 1 is a block diagram of an NC system which realizes a prior art numerical control method.
Figure 4:
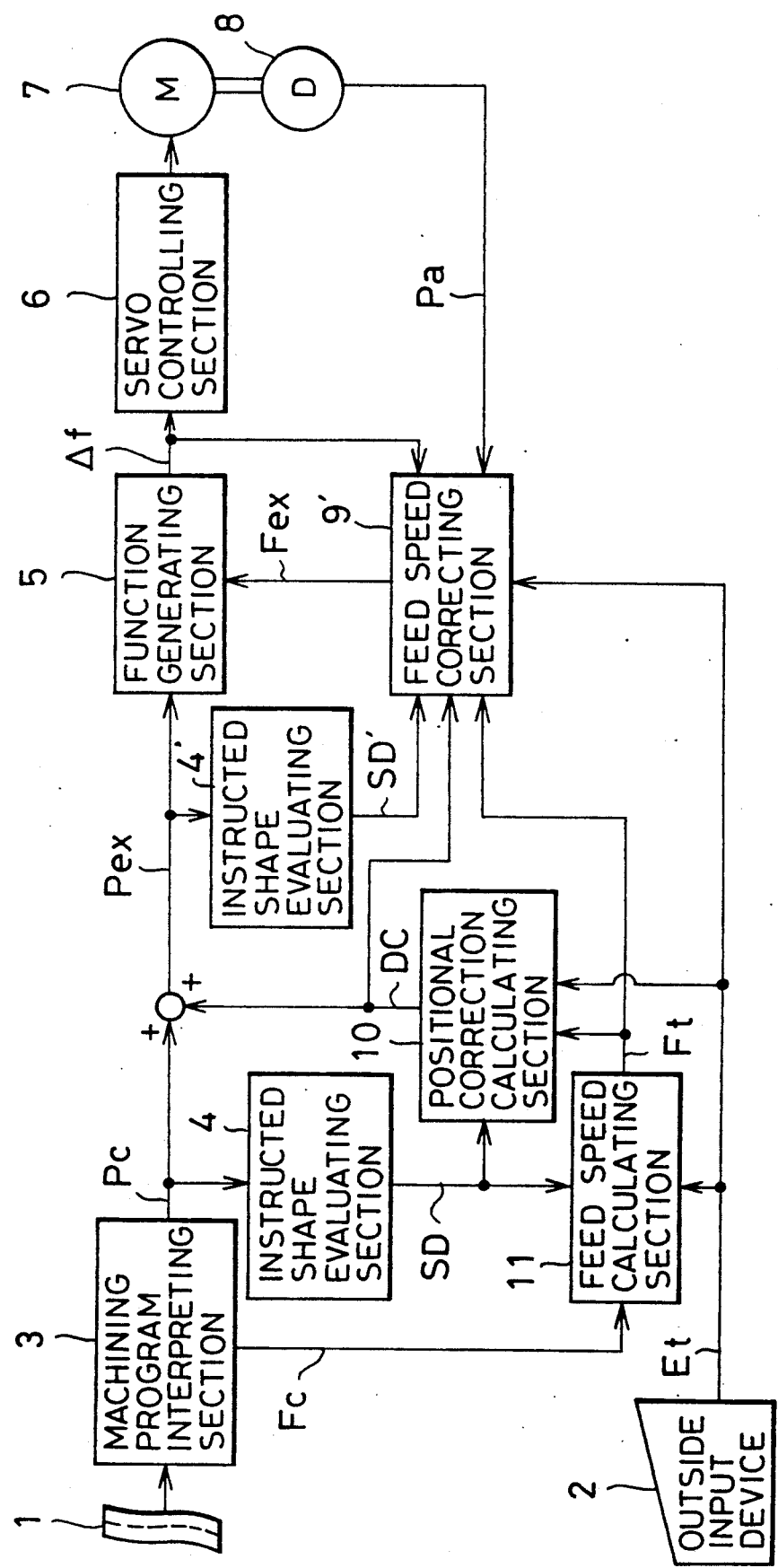
FIG. 4 is a block diagram of an NC system which realizes the numerical control method of this invention.

FIG. 4 is a block diagram of an embodiment of the NC system according to the method of this invention where, corresponding to FIG. 1, the same parts are denoted with the same reference numerals and their description is omitted to avoid duplication.

As shown in FIG. 4, the NC system of this invention is additionally provided with a feed speed calculating section 11 which calculates the second feed speed $F_t$ based on the first feed speed $F_c$, the first shape evaluated data SD and the first path error $E_t$, a positional correction calculating section 10 which predicts path errors caused by the lag or the like in the servo system at the second feed speed $F_t$ based on the first shape evaluated data SD, and which calculates a first positional correction $D_c$ in accordance with the first machining path $P_c$ based on the predicted path errors and the inputted first path error $E_t$, and an instructed shape evaluating section 4' which calculates the second shape evaluated data SD' based on the second machining path $P_{ex}$ which has been corrected with the first positional correction $D_c$.

The feed speed calculation section 11 inputs the first shape evaluated data SD, the first path error $E_t$ (a tolerable path error inputted by an operator from the outside input device 2) and time constant for acceleration and deceleration T (time constant (inner parameter) used in processes of acceleration and deceleration carried out in the servo controlling section 6), and outputs the second feed speed $F_t$.

The second feed speed $F_t$ which are calculated with the coordinates data $P_c(i)$ which make the first machining path $P_c$ are represented $F_t(i)$.

Case of the first shape evaluated data SD (i) = $R_c(i)$;

$$F_t(i) = \frac{\sqrt{24 \cdot E_t \cdot R(i)}}{T} \quad (4)$$

(T is a time constant)

Case of the first shape evaluated data SD(i) = $A_g(i)$;

$$F_t(i) = \frac{8 \cdot E_t}{T \cdot \sqrt{2 \cdot \{1 - \cos(A_g(i))\}}} \quad (5)$$

(T is a time constant)

The positional correction calculating section 10 inputs the second feed speed $F_t$, the first path error $E_t$ and the first shape evaluated data SD and outputs the first positional correction $D_c$.

The operation will be described with reference to FIG. 5.

Radius of curvature $R_c(i)$ on the point specified by the coordinates data $P_c(i)$ which make the first machining path $P_c$ is adopted as the first shape evaluated data SD.

FIG. 6 is a flow chart showing the calculation of the second machining path $P_{ex}$ described below.

An actual machining path $P_s$ in case driving feed shaft motor 7 under the condition that; machining path = the first machining path $P_c$; feed speed = the second feed speed $F_t$; is predicted (Step S20). The detail content of predicting the actual machining path $P_s$ is easily understood by means of simulations or the like, because the first machining path $P_c(i)$ using the first shape evaluated data SD. Therefore, its description is ommited here.

The path error (after this, designed as the second path error $\epsilon_e$) between the predicted actual machining path $P_s$ and the first machining path $P_c$ is calculated (Step S21). If the second path error $\epsilon_e$ on the point specified by the coordinates data $P_c(i)$ which make the first machining path $P_c$ is represented $\epsilon_e(i)$, the second path error $\epsilon_e(i)$ is the difference with regard to the radial direction of the radius of curvature between the predicted actual machining path $P_s$ and the first machining path $P_c$.

The first positional correction $D_c$ is calculated by subtracting the first path error $E_t$ from the second path error $\epsilon_e$ (Step S22). If the first positional correction $D_c$ on the point specified by the coordinates data $P_c(i)$ which make the first machining path $P_c$ is represented $D_c(i)$ is derived as follows:

$$D_c(i) = \epsilon_e(i) - E_t \quad (6)$$

Figure 5:
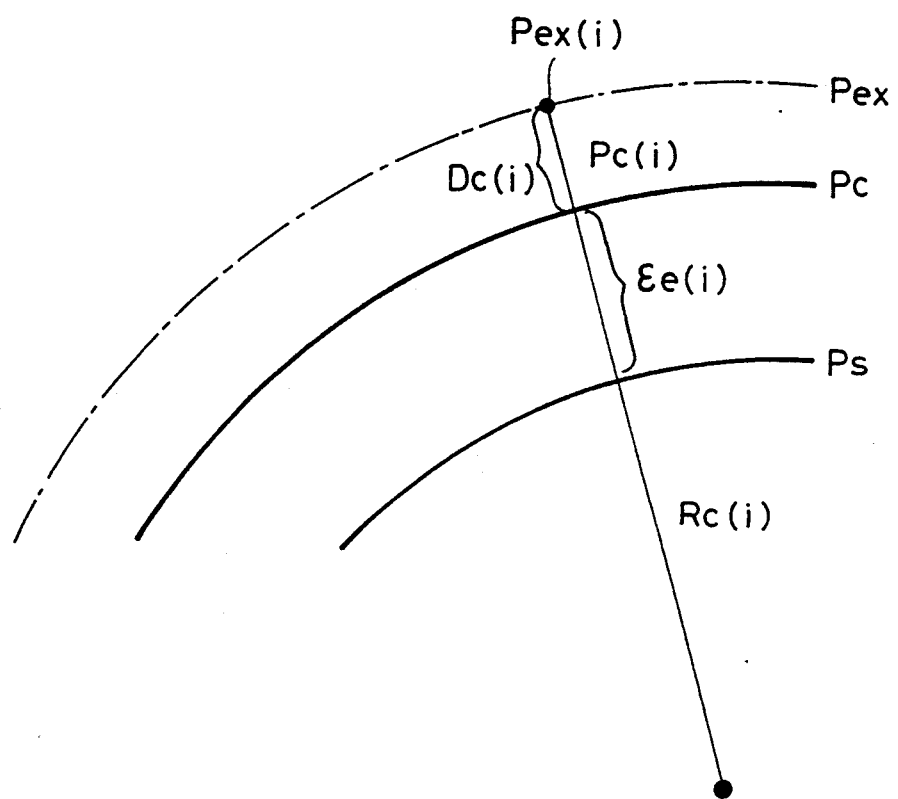
FIG. 5 is a view of explaining the method of calculation of the second machining path $P_{ex}$.

The positional corrected machining path $P_{ex}$ (after this, designated as the second machining path $P_{ex}$) shown in FIG. 5 is calculated by adding the first positional correction $D_c$ to the first machining path $P_c$ (Step S23). If coordinates data which make the second machining path $P_{ex}$ are represented $P_{ex}(i)$, $P_{ex}(i)$ is derived as follows:

$$P_{ex}(i) = P_c(i) + D_c(i) \quad (7)$$

The instructed shape evaluating section 4' inputs the second machining path $P_{ex}$ and outputs the second shape evaluated data SD'.

The process in the instructed shape evaluating section 4' is the same as that of the instructed shape evaluating section 4 except the input data, replaced with the second machining path $P_{ex}$.

Figure 7:
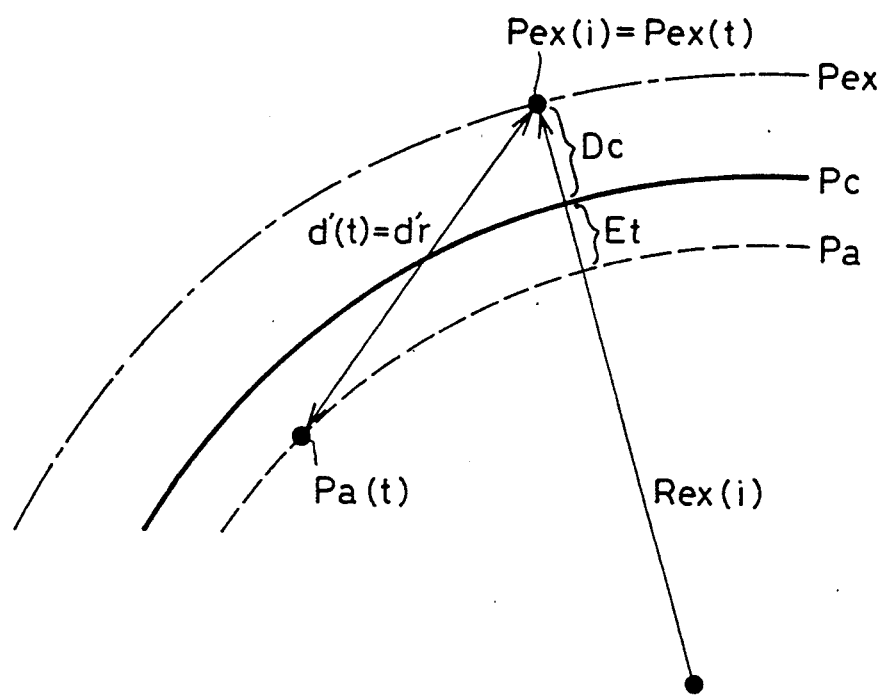
FIG. 7 is a view of explaining the method of calculation of the third feed speed $F_{ex}$ in this invention.

The feed speed correcting section 9' inputs the second feed speed $F_t$, the first path error $E_t$, the first positional correction $D_c$, the second shape evaluated data SD', the amount of movement $\Delta f$ per unit of to time (data outputted from the function generating section 5) and the detected value $P_a$ (the actual machining path which is outputted from the position detector 8 attached to a feed shaft motor 7), and outputs the third feed speed $F_{ex}$.

the operation will be described with reference to FIG. 7.

Radius of curvature $R_{ex}(i)$ on the point specified by the coordinates data $P_{ex}(i)$ which make the second machining path $P_{ex}$ is adopted as the second shape evaluated data SD'.

A d'(t) which is a follow-up lag at a time "t" is related to coordinates data at a time "t" of the second machining path, denoted $P_{ex}(t)$, and coordinates data at a time "t" of the actual machining path, denoted $P_a(t)$, as following formula CR.

$$d'(t)=P_{ex}(t)-P_a(t)CR \qquad (8)$$

Figure 8:
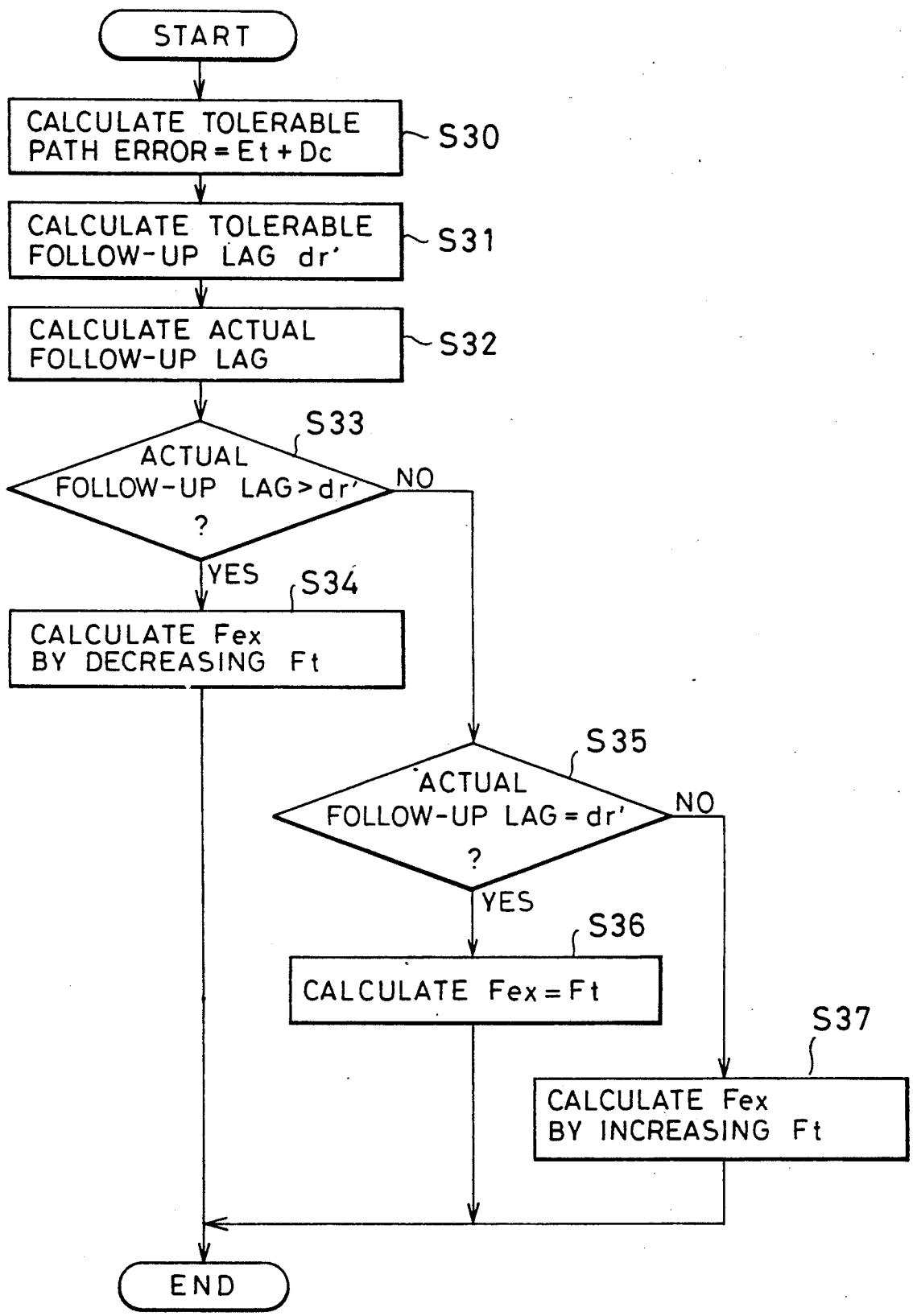
FIG. 8 is a flow chart of the calculation of the third feed speed $F_{ex}$ in this invention.

FIG. 8 is a flow chart showing the operation of the feed speed correcting section 9' described below.

A tolerable path error on the second machining path $P_{ex}$ is calculated, grounded on that a tolerable path error on the first machining path is the first path error $E_t$, by the following formula (Step S30).

A tolerable path error on the second machining path $P_{ex}$ = the first path error $E_t$ + the first positional correction $D_c$.

A tolerable follow-up lag "$d_r$'" is calculated which causes a path error which is equal to (the first path error + the first positional correction $D_c$) in case driving feed shaft motor 7 under the condition that; machining path = the second machining path $P_{ex}$ (Step S31). The detail content of predicting the tolerable follow-up lag "$d_r$'" is distinct because the second machining path $P_{ex}$ is approximated to the curved line of which curvature radius is $R_{ex}(i)$ using the second shape evaluated data SD', therefore its description will be ommited here.

The coordinates data of an instructed machining path (which is virtually the same as the second machining path $P_{ex}$) are calculated by accumulating the amount of movement Δf per unit of time, and an actual follow-up lag calculated by subtracting the detected actual machining path $P_a$ from the calculated coordinates data (Step S32).

If the actual follow-up lag > the tolerable follow-up lag "$d_r$'";
the third feed speed $F_{ex}$ is calculated by decreasing the second feed speed $F_t$ (Steps S33 and S34).

If the actual follow-up lag = the tolerable follow-up lag "dr'";
the third feed speed $F_{ex}$ is set up equal to the second feed speed $F_t$ (Steps S35 and S36).

If the actual follow-up lag < the tolerable follow-up lag "$d_r$'";
the third feed speed $F_{ex}$ is calculated by increasing the second feed speed $F_t$, or the third feed speed $F_{ex}$ is set up equel to the second feed speed $F_t$ (Step S37).

The function generating section 5 inputs the second machining path $P_{ex}$ and the third feed speed $F_{ex}$, and outputs the amount of movement Δf per unit of time.

A feed speed per unit of time is calculated basing on the third feed speed $F_{ex}$, and the amount of movement Δf per unit of time is calculated by distributing the feed speed per unit of time to each feed shaft.

Figure 9:
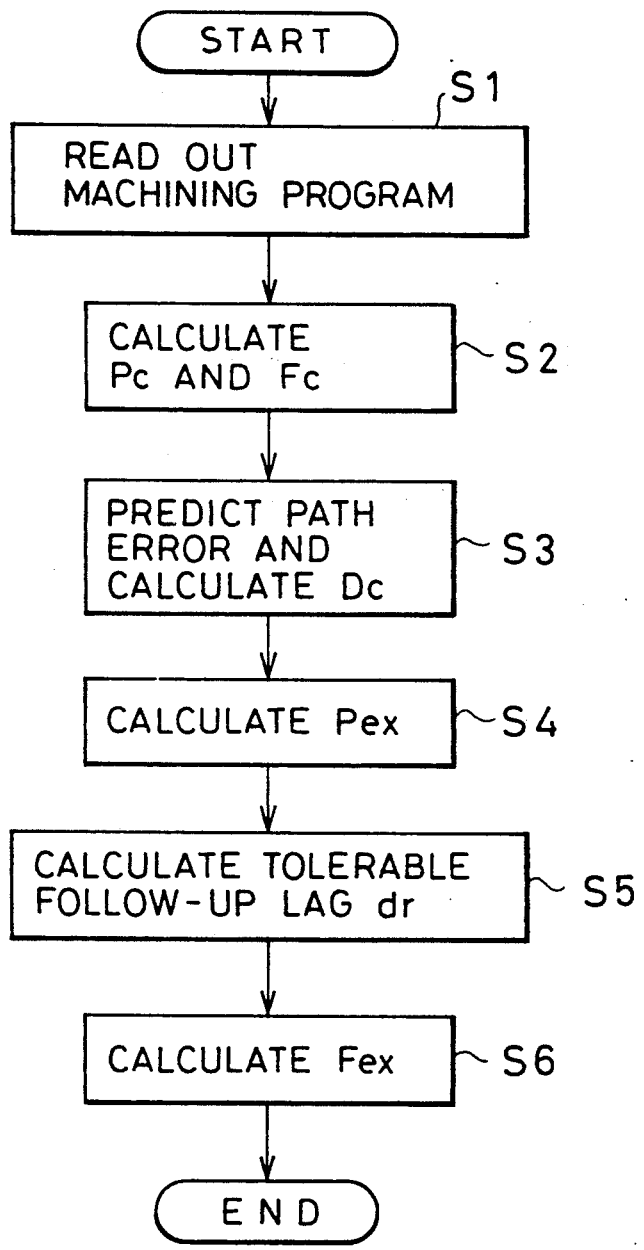
FIG. 9 is a flow chart of the operation thereof.

FIG. 9 is a flow chart showing the operation of the numerical control method of this invention described below.

A machining program 1 is inputted to the NC system via a tape reader or the like, and further the data for each block of the machining program 1 is read out in the machining program interpreting section 3 (Step S1). The machining program interpreting section 3 analyses the data to calculate the first machining path $P_c$ and the first feed speed $F_c$ (Step S2). The feed speed calculating section 11 sets the second feed speed $F_t$, and the positional correction calculating section 10 predicts the second path error at the feed speed $F_t$ caused by the lag and so on in the servo system based on the first shape evaluated data SD, and calculates the first positional correction $D_c$ corresponding to the first machining path $P_c$ with the predicted second path error and the inputted first path error $E_t$ (Step S3). The first machining path $P_c$ is corrected based on the first positional correction $D_c$ thereof, and the second machining path $P_{ex}$ is newly calculated (Step S4). The second machining path $P_{ex}$ is sent to the function generating section 5 and to the instructed shape evaluating section 4', and the instructed shape evaluating section 4' calculates the second shape evaluated data SD' based on the second machining path $P_{ex}$ in a process similar to the instructed shape evaluating section 4.

The feed speed correcting section 9' calculates the tolerable follow-up lag based on the second shape evaluated data SD' in such a manner that the path error caused when the function is generated based on the second machining path $P_{ex}$ by the function generating section 5 remains within the sum of the first path error $E_t$ and the first positional correction $D_c$ (Step S5). The feed speed correcting section 9' also calculates the actual follow-up lag based on the amount of movement Δf per unit time outputted from the function generating section 5 and the detected value $P_a$ from the position detector 8. Further, the feed speed correcting section 9' corrects the second feed speed $F_t$ so that the actual follow-up lag remains within the tolerable follow-up lag and calculates a new instructed feed speed $F_{ex}$ (Step S6). A description will be omitted for the method of correcting the feed speed as it is similar to the aforementioned prior art method.

The function generating section 5 calculates the amount of movement Δf per unit time by generating a function based on the second machining path $P_{ex}$ and the third feed speed $F_{ex}$. The amount of movement Δf per unit of time is sent to the feed speed correcting section 9' and to the servo controlling section 6. The servo controlling section 6 drives the servomotor 7 based on the inputted amount of movement Δf per unit of time.

The second feed speed $F_t$ which is used for predicting the second path error by the positional correction calculating section 10 and which is corrected by the feed speed correcting section 9' may be either one of the first feed speed $F_c$ obtained by the machining program (1) and the value which is calculated in advance to make the path error become n (n≧1) times of the first path error $E_t$ (2). The former method (1) is the one which holds the relation $F_t=F_c$ irrespective of the first shape evaluated data SD of the first machining path $P_c$ in the feed speed calculating section 11 while the latter method (2) is a method which determines the second feed speed $F_t$ based on the first shape evaluated data SD so that the path errors should remain within n (n≧1) times of the first path error $E_t$. The letter n denotes an internal parameter of the feed speed calculating section 11.

The second path error predicted by the positional correction calculating section 10 increases in proportion to the second feed speed $F_t$ while the first positional correction $D_c$ increases in proportion to the second feed speed $F_t$ as it is substantially identical to the value obtained by subtracting the first path error $E_t$ (constant) from the second path error in the stationary state. Moreover, since the second path error predicted by the positional correction calculating section 10 increases at a corner where the rate of changes in the machining shape becomes large, the first positional correction $D_c$ increases at the corner shapes.

As described above, the higher the speed of the first feed speed $F_c$ obtained from the machining program, and the higher the rate of shape changes of the first machining path $P_c$ obtained from the machining program, and the first positional correction $D_c$ in the former method (1) becomes larger. In the latter method (2), the second path error predicted is clamped to be less than $E_t \times n$ ($n \geq 1$). The first positional correction $D_c$ is substantially equal to the value obtained by the first path error $E_t$ from the second path error. If it is assumed that $E_t \times (n-1)$ is a first tolerable positional correction $E_p$, the first positional correction $D_c$ could be clamped to be less than the first tolerable positional correction $E_p$ irrespective of the shape on the first machining path $P_c$ instructed from the machining program and of the first feed speed $F_c$.

Another embodiment will now be described wherein the first tolerable positional correction $E_p$ is inputted by an operator via an outside input device so that the upper limit of the positional correction may be set by the operator.

Figure 2:
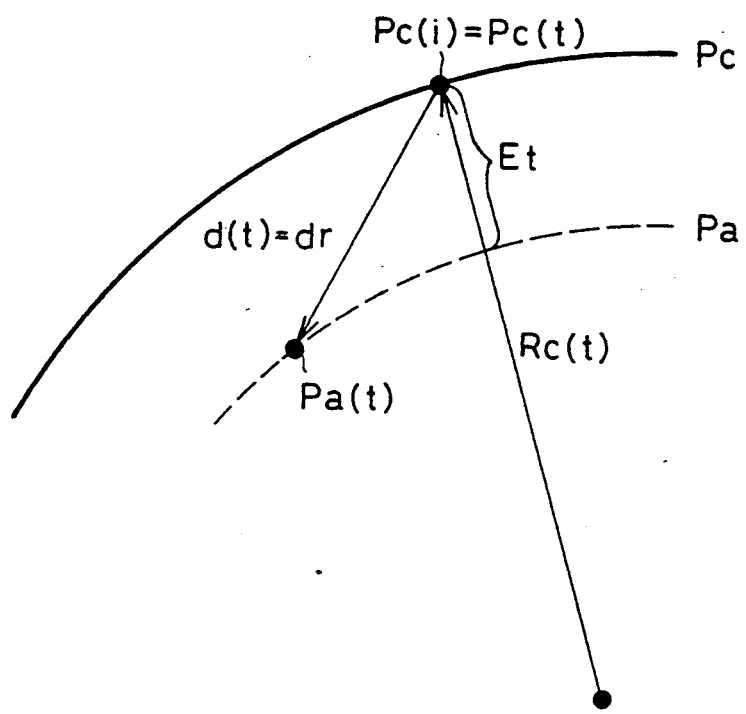
FIG. 2 is a view of explaining the method of calculation of the third feed speed $F_{ex}$ in a prior art.
Figure 3:
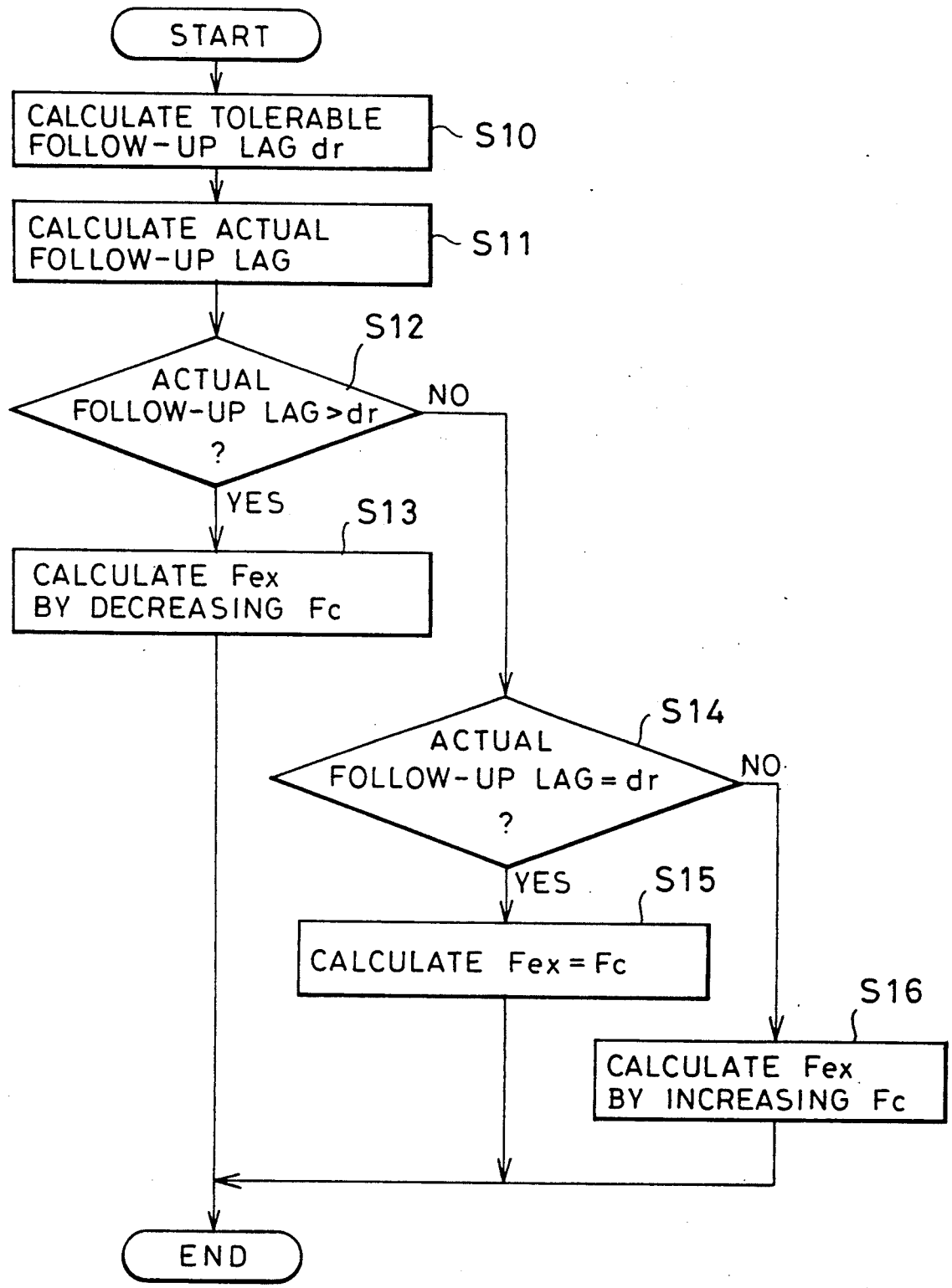
FIG. 3 is a flow chart of the calculation of the third feed speed $F_{ex}$ in a prior art.
Figure 10:
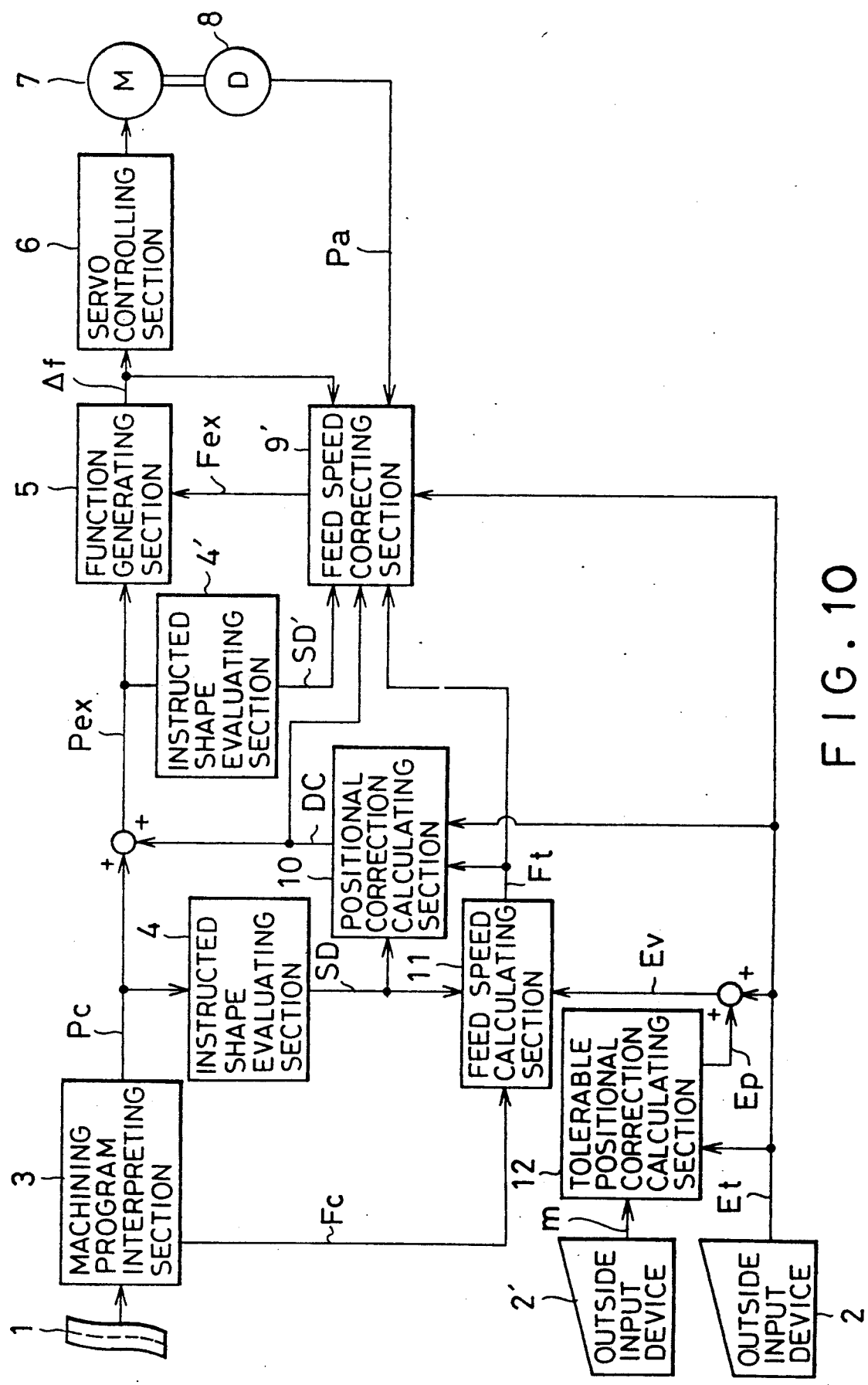
FIG. 10 is a block diagram of another embodiment of the NC system of the numerical control method of this invention.

FIG. 10 is a block diagram showing another embodiment for realizing the numerical control method of this invention where in correspondence to FIG. 2, the same parts are denoted with the same numerals and their descriptions are omitted to avoid duplication.

As shown in FIG. 10, the NC system is additionally provided with an outside input device 13 to which a coefficient m is inputted in order to clamp the second path error in size, and a tolerable positional correction calculating section 12 which calculates a first tolerable positional correction $E_p$ from the first path error $E_t$ and the coefficient m.

The tolerable positional correction calculating section 12 is capable of calculating the first tolerable positional correction $E_p$ by multiplying the first path error $E_t$ with the coefficient m since an operator can input the coefficient which is equivalent to the coefficient $(n-1)$ described in relation to the embodiment in FIG. 4 via the outside input device 13. If it is assumed that the sum of the first tolerable positional correction $E_p$ and the first path error $E_t$ is a feed speed calculation error $E_v$, the value $E_v$ becomes equivalent to the value $E_t \times n$ described in relation to the embodiment shown in FIG. 4, and the internal parameter thereof can be set from outside with (m+1). The feed speed calculating section 11 calculates the second feed speed $F_t$ which allows the path error to remain within the scope of the calculated feed speed calculation error $E_v$ based on the first shape evaluated data SD.

Figure 11A:
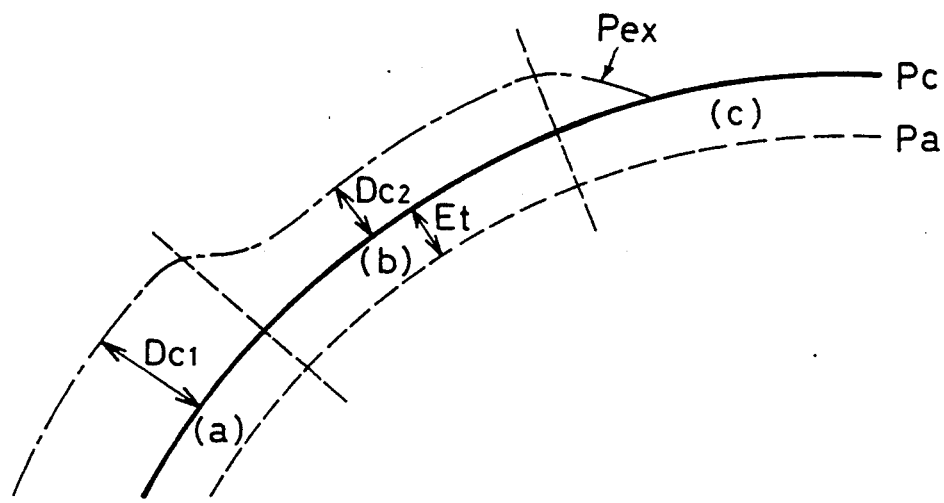
FIGS. 11A and 11B are explanatory describing the first positional correction $D_c$ and changes in the second feed speed $F_t$.
Figure 11B:
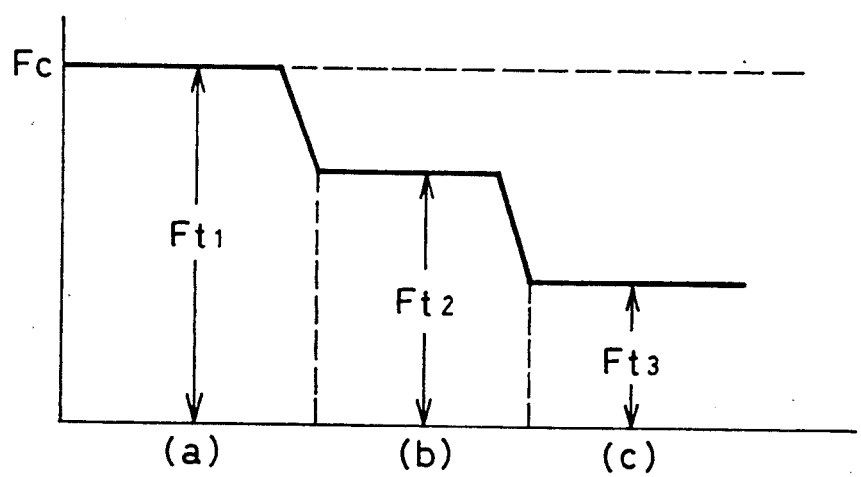

FIG. 11A shows the changes of the first positional correction $D_c$ based on the first tolerable positional correction $E_p$ which is set by the operator. FIG. 11B shows the second feed speed $F_t$ calculated by the feed speed calculating section 11 based on the feed speed calculation error $E_v$. In FIG. 11A, the solid line represents the first machining path $P_c$ obtained by the machining program, the broken line the actual machining path $P_a$, and the dot-and-chain line the second machining path $P_{ex}$ after the positional correction.

The operator is assumed to set the first tolerable positional correction $E_p$ to be m-times (m>1) of the first path error $E_t$ in the section (a) on the first machining path $P_c$, to be equal to $E_t$ (m=1) in the section (b), and to be zero (m=0) in the section (c). The feed speed calculation error $E_v$ in the section (a) is equivalent to the (m+1) times of the first path error $E_t$, two times of the first path error $E_t$ in the section (b) and equal to the first path error $E_t$ in the section (c).

The first positional corrections $D_c$ are denoted as $D_{c1}$ in the section (a), $D_{c2}$ in the section (b) and $D_{c3}$ in the section (c), and the second feed speeds $F_t$ in the sections are assumed to be $F_{t1}$, $F_{t2}$ and $F_{t3}$ respectively to hold the relation shown by the following formula (9).

$$\left.\begin{array}{l} D_{c1} < mF_t, \; D_{c2} < E_t, \; D_{c3} = 0 \\ D_{c1} > D_{c2} > D_{c3} \\ F_{t1} > F_{t2} > F_{t3} \end{array}\right\} \quad (9)$$

The operator thus becomes capable of adjusting the positional correction while observing the actual movement of the tool and based on the machining state and type of machining by arbitrarily clamping the first positional correction $D_c$ to make the path error remain within the scope of the first path error $E_t$. When the operator wishes to suspend the machining operation temporarily during a work, he can suspend it simply by making the first tolerable positional correction $E_p$ equal to the first path error $E_t$ (m=1). The deviation caused by the correction from the first machining path $P_c$ of the machining program would remain constantly within the first path error $E_t$ no matter where the operator suspends the machining. If manual cutting operation is required for a section by manual interruption, it can be smoothly made by simply making the first tolerable positional correction $E_p$ zero (m=0). When the work does not require any sispension or manual interruption, the maximum speed can be attained in cutting/feeding simply by setting the first tolerable positional correction $E_p$ at a maximum. In order to avoid an increase of the actual path error beyond the predicted path error because of some unpredictable reasons exceeding the first path error $E_t$, the positional correction should be adjusted smaller.

Although a description has been made in the foregoing embodiments for the method which designates the first tolerable positional correction $E_p$ calculation from the outside input device 13, it may be designated by the machining program 1. Although the information necessary for calculating the first tolerable positional correction $E_p$ is described as a coefficient m which is to be multiplied with the first path error $E_t$ in the foregoing statement, it may be the first tolerable positional correction $E_p$ instead.

In the second embodiment, although the size of the first positional correction $D_c$ which is to be added to the first machining path $P_c$ instructed by the machining program is arbitrarily modified based on the first tolerable positional correction $E_p$ which can be set externally, the first positional correction $D_c$ may be modified in accordance with the machining shape of the first machining path $P_c$. In other words, it becomes difficult to predict the path errors at sections such as curves where the rate of shape changes on the first machining path $P_c$ is high or corners where the rate of changes is high as acceleration changes at the driving section and an unpredictable lag in the servo system tends to occur to thereby lower the precision of the first positional correction $D_c$ calculated in the feed speed calculating section 11. The precision, however, is increased in machining if the first positional correction $D_c$ is adjusted in accordance with the shapes of the first machining path $P_c$ as the first positional correction $D_c$ is made smaller for the sections where the rate of changes in shapes is high and the path error prediction is more difficult while it is maximized for the sections where the rate of changes in shape is substantially constant and prediction of the path error is relatively easy.

Figure 12:
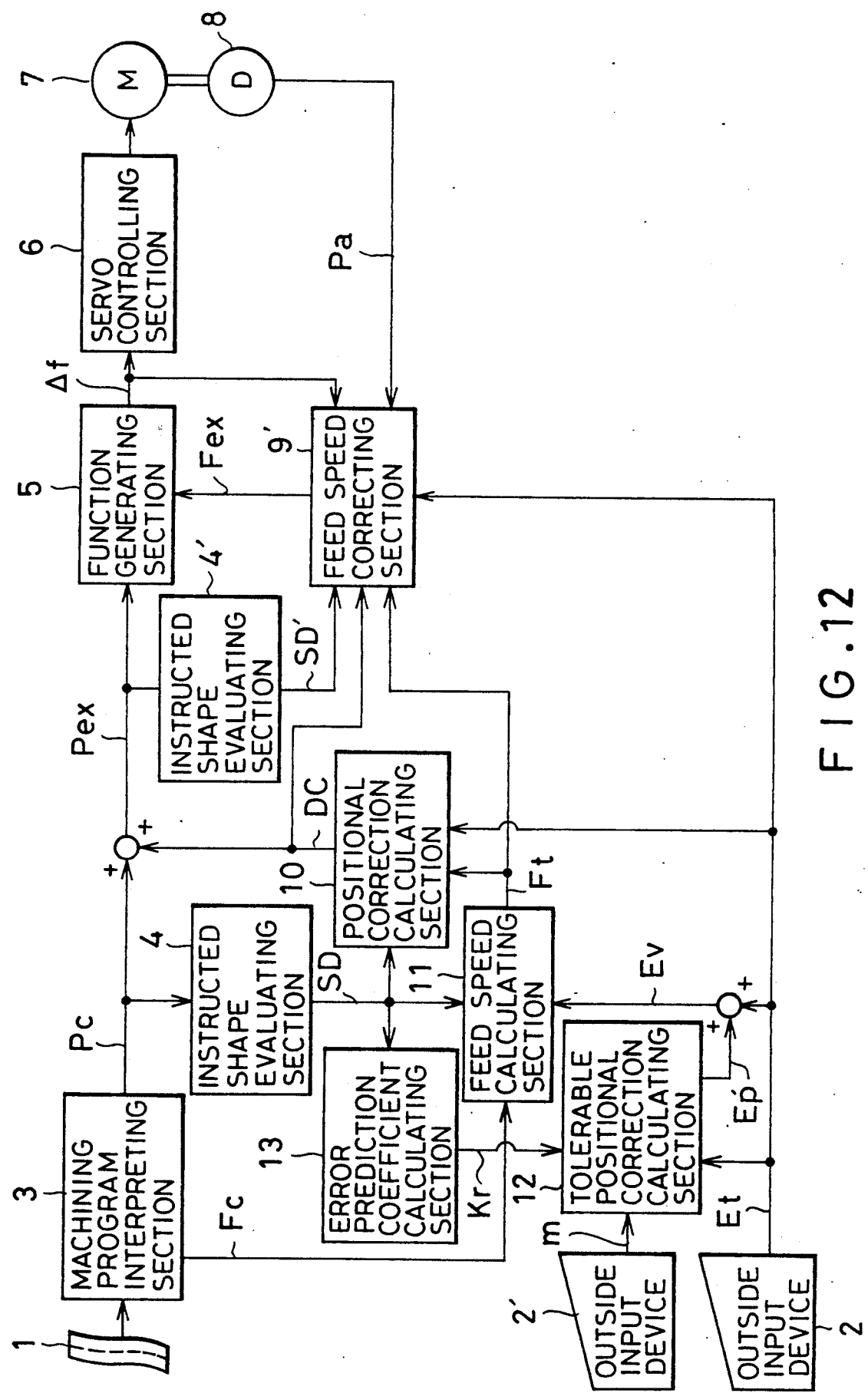
FIG. 12 is a block diagram of still another embodiment of the NC system which realizes the method of this invention.

The method will now be described in relation to a third embodiment. FIG. 12 is a block diagram showing the third embodiment of the numerical control method of this invention, where in correspondence to FIG. 10 the same parts are denoted with the same references and their description is omitted to avoid duplication.

As shown in FIG. 12, the NC system is provided with an error prediction coefficient calculating section 13 which calculates a path error prediction coefficient $K_r$ based on the first shape evaluated data SD outputted from the instructed shape evaluating section 4. The error prediction coefficient calculating section 13 inputs the first shape evaluated data SD and outputs the path error prediction coefficient $K_r$. The path error prediction coefficient $K_r$ is a real number data ranging between "0" and "1" which indicates shape changing rate of the first machining path $P_c$. For instance, when the first shape evaluated data SD(i) on the point specified by the coordinates data $P_c(i)$ which make the first machining path $P_c$ is the angle $A_g(i)$ at which line segment $\overline{P_c(i-1)P_c(i)}$ and line segment $\overline{P_c(i) P_c(i+1)}$ meet, and the path error prediction coefficient $K_r$ on the point specified by the coordinates data $P_c(i)$ which make the first machining path $P_c$ is represented $K_r(i)$, $K_r(i)$ is derived as follows.

$$\left. \begin{array}{l} \text{If } 90 \leq A_g(i) \leq 180, K_r(i) = 0 \\ \text{If } 0 \leq A_g(i) < 90, K_r(i) = (90 - A_g(i))/90 \end{array} \right\} \quad (10)$$

The error prediction coefficient calculating section 13 analyses the shape of the first machining path $P_c$ instructed from the machining program 1 based on the first shape evaluated data SD which is outputted from the instructed shape evaluating section 4 and calculates the path error prediction coefficient $K_r$. The path error prediction coefficient $K_r$ satisfies the condition of $0 \leq K_r \leq 1$ in accordance with the first shape evaluated data SD. The path error prediction coefficient $K_r$ assumes a value close to zero for the machining shapes such as corners where path errors are influenced easily from unpredictable factors while it assumes a value close to "1" for the machining shapes which are not easily influenced by inpredictable factors. The path error prediction coefficient $K_r$ is sent to the tolerable positional correction calculating section 12, which in turn calculates the second tolerable positional correction $E_p'$ by multiplying the first path error $E_t$ with the coefficient m and the error prediction coefficient $K_r$. The second tolerable positional correction $E_p'$ is derived as follows.

$$E_p' = E_t \times m \times K_r \quad (11)$$

Therefore, at corners where path errors are not fully predictable, the second tolerable positional correction $E_p'$ becomes close to zero and positional correction is not executed. Conversely, at machining shapes where path errors are easily predicted, the second tolerable positional correction $E_p'$ becomes substantially equal to the value inputted by the operator, and positional correction is executed.

Although the path error prediction coefficient $K_r$ is sent to the tolerable positional correction calculating section 12 in the above embodiment, it may be sent to the positional correction calculating section 10, which calculates a second positional correction $D_c'$ by multiplying the path error prediction coefficient $K_r$ with the first positional correction $D_c$ to thereby modify the first positional correction $D_c$ in accordance with the machining shapes of the first machining path $P_c$.

According to the numerical control method of this invention, stable machining precision can be secured allowing path errors which may be caused due to unpredictable dynamic factors. Therefore, this invention enables high speed and highly precise machining irrespective of shapes. This invention also enables simple interruption for manual cutting by an operator.

It should be understood that many modifications and adaptations of the invention will become apparent to those skilled in the art and it is intended to encompass such obvious modifications and changes in the scope of the claims appended hereto.

What is claimed is:

1. A numerical control method for controlling a machining path of a tool in accordance with a first machining path data denoting an instructed machining path from a machine program, a first feed speed data denoting an instructed feed speed from the machine program, and a first path error data denoting a prespecified tolerable path error, said method comprising the steps of:

determining a second feed speed data which causes a machining path error that is N times as large as that of the first path error data when the machining path of the tool is driven according to the first machining path data, N being determined in advance;

predicting an actual machining path of the tool according to the first machining path data and the second feed speed data;

determining a second path error data according to a difference between the predicted actual machining path and the first machining path data;

obtaining a first positional correction data by subtracting the first path error data from the second path error data;

calculating a second machining path data by adjusting the first machining path data by an amount corresponding to the first positional correction data in a direction opposing a direction in which a path error occurs;

calculating an amount of movement per unit of time in accordance with the second machining path data and the second feed speed data;

driving the machine tool according to the calculated amount of movement per unit of time; and, detecting an actual machining path of the driven machine tool, calculating an actual follow-up lag data between the detected actual machining path and the second machining path data, and correcting the second feed speed data according to the actual follow-up lag data and the first path error data.

2. A numerical control method for controlling a machining path of a tool in accordance with a first machining path data denoting an instructed machining path from a machine program, a first feed speed data denoting an instructed feed speed from the machine program, and a first path error data denoting a prespecified tolerable path error, said method comprising the steps of:
- determining a path error prediction coefficient according to a directional rate of change of the first machining path data;
- predicting an actual machining path of the tool according to the first machining path data and the first feed speed data;
- determining a second path error data according to a difference between the predicted actual machining path and the first machining path data;
- obtaining a first positional correction data by subtracting the first path error data from the second path error data;
- obtaining a second positional correction data by multiplying the first positional correction data by the path error correction coefficient;
- calculating a second machining path data by adjusting the first machining path data by an amount corresponding to the second positional correction data in a direction opposing a direction in which a path error occurs;
- calculating an amount of movement per unit of time in accordance with the second machining path data and the first feed speed data;
- driving the machine tool according to the calculated amount of movement per unit of time; and,
- detecting an actual machining path of the driven machine tool, calculating an actual follow-up lag data between the detected actual machining path and the second machining path data, and correcting the first feed speed data according to the actual follow-up lag data and the first path error data.

3. A numerical control method for controlling a machining path of a tool in accordance with a first machining path data denoting an instructed machining path from a machine program, a first feed speed data denoting an instructed feed speed from the machine program, a first path error data denoting a prespecified tolerable path error, and first tolerable positional correction data, said method comprising the steps of:
- determining a second feed speed data which causes a machining path error that is within a sum of the first tolerable positional correction data and the first path error data when the machining path of the tool is driven according to the first machining path data;
- predicting an actual machining path of the tool according to the first machining path data and the second feed speed data;
- determining a second path error data according to a difference between the predicted actual machining path and the first machining path data;
- obtaining a first positional correction data by subtracting the first path error data from the second path error data;
- calculating a second machining path data by adjusting the first machining path data by an amount corresponding to the first positional correction data in a direction opposing a direction in which a path error occurs;
- calculating an amount of movement per unit of time in accordance with the second machining path data and the second feed speed data;
- driving the machine tool according to the calculated amount of movement per unit of time; and,
- detecting an actual machining path of the driven machine tool, calculating an actual follow-up lag data between the detected actual machining path and the second machining path data, and correcting the second feed speed data according to the actual follow-up lag data and the first path error data.

4. A numerical control method for controlling a machining path of a tool in accordance with a first machining path data denoting an instructed machining path from a machine program, a first feed speed data denoting an instructed feed speed from the machine program, a first path error data denoted a prespecified tolerable path error, and first tolerable positional correction data, said method comprising the steps of:
- determining a path error prediction coefficient according to a directional rate of change of the first machining path data;
- determining a second tolerable position data by multiplying the first tolerable positional correction data by the path error prediction coefficient;
- determining a second feed speed data which causes a machining path error that is within a sum of the second tolerable positional data and the first path error data when the machining path of the tool is driven according to the first machining path;
- determining a second path error data according to a difference between the predicted actual machining path and the first machining path data;
- obtaininga first positional correction data by subtracting the first path error data from the second path error data;
- calculating a second machining path data by adjusting the first machining path data by an amount corresponding to the first positional correction data in a direction opposing a direction in which a path error occurs;
- calculating an amount of movement per unit of time in accordance with the second machining path data and the second feed speed data;
- driving the machine tool according to the calculated amount of movement per unit of time; and,
- detecting an actual machining path of the driven machine tool, calculating an actual follow-up lag data between the detected actual machining path and the second machining path data, and correcting the second feed speed data according to the actual follow-up lag data and the first path error data.

* * * * *